United States Patent
Yamano et al.

(10) Patent No.: US 7,855,749 B2
(45) Date of Patent: Dec. 21, 2010

(54) DIGITAL CAMERA HAVING MULTIPLE POWER OFF MODES

(75) Inventors: Shozo Yamano, Tokyo (JP); Tetsuo In, Kawasaki (JP)

(73) Assignee: Nikon Corporation, Tokyo (JP)

( * ) Notice: Subject to any disclaimer, the term of this patent is extended or adjusted under 35 U.S.C. 154(b) by 176 days.

(21) Appl. No.: 12/007,019

(22) Filed: Jan. 4, 2008

(65) Prior Publication Data
US 2008/0136944 A1 Jun. 12, 2008

Related U.S. Application Data

(63) Continuation of application No. 10/851,162, filed on May 24, 2004, now abandoned.

(30) Foreign Application Priority Data
May 28, 2003 (JP) .............................. 2003-150791

(51) Int. Cl.
*H04N 5/225* (2006.01)
(52) U.S. Cl. .................................. 348/372; 348/231.99
(58) Field of Classification Search ............ 347/231.99, 347/231.9, 372
See application file for complete search history.

(56) References Cited

U.S. PATENT DOCUMENTS

| 5,852,467 | A | 12/1998 | Ogino |
| 6,266,083 | B1 | 7/2001 | Sakaegi et al. |
| 7,015,959 | B1 * | 3/2006 | Morita ..................... 348/231.9 |
| 7,496,273 | B2 * | 2/2009 | Miyamoto ................... 386/46 |
| 2002/0067923 | A1 * | 6/2002 | Fujimura ..................... 396/429 |
| 2004/0095507 | A1 * | 5/2004 | Bishop et al. ............... 348/441 |

FOREIGN PATENT DOCUMENTS

JP A-11-252422 9/1999

* cited by examiner

*Primary Examiner*—Gevell Selby
(74) *Attorney, Agent, or Firm*—Oliff & Berridge, PLC (57) ABSTRACT

Either of two power off modes can be selected in a digital camera that reads out images from an image-capturing element, temporarily stores them in a buffer memory and then transfers and records the images from the buffer memory into a recording medium. In a first power off mode, the supply of stabilized power is stopped in response to a main switch off operation only after unrecorded images present in the buffer memory are all recorded into the recording medium. In a second power off mode, the supply of the stabilized power is stopped immediately in response to a main switch off operation regardless of whether or not there are yet-to-be recorded images present in the buffer memory. The power is cut off in conformance to the current power off mode setting when the main switch is turned off.

9 Claims, 7 Drawing Sheets

DIGITAL CAMERA HAVING MULTIPLE POWER OFF MODES

This is a Continuation of application Ser. No. 10/851,162 filed May 24, 2004. The disclosure of the prior application is hereby incorporated by reference herein in its entirety.

INCORPORATION BY REFERENCE

The disclosure of the following priority application is herein incorporated by reference:

Japanese Patent Application No. 2003-150791 filed May 28, 2003

BACKGROUND OF THE INVENTION

1. Field of Invention

The present invention relates to a digital camera that records captured images into a recording medium such as a memory card.

2. Description of the Related Art

There is a type of digital camera known in the related art in which if the camera main switch is turned off before photographic image data are processed and recorded, the power to the camera is turned off only after the image data processing and the image data recording are completed (see, for instance, Japanese Laid Open Patent Publication No. H 11-252422).

During a continuous photographing operation (continuous shooting operation), an image is photographed before the processing and the recording of the preceeding image data read out from the image-capturing element are completed and for this reason, the image data are temporarily stored in a volatile buffer memory in such a digital camera. Then, as the main switch is turned off, the power to the camera is held in an ON state until all the image data stored in the buffer memory are transferred and recorded into the recording medium and upon completion of the recording operation, the power to the camera is turned off.

This type of digital camera has an advantage in that photographed images are recorded and thus saved with a high degree of reliability even when the main switch is turned off immediately after the photographing operation. This feature may be found particularly convenient by users to whom the characteristics inherent to digital cameras that a greater length of time must be allowed to transfer and record images into the recording medium compared to the conventional silver halide camera.

However, this type of digital camera does not accommodate a user who does not wish to record photographed images and instead wishes to start the next photographing operation immediately since the user cannot erase all the images temporarily stored in the buffer memory in a batch by turning off the main switch. Instead, the user has to wait for the recording of unnecessary images to be completed, which may cost him a good photo opportunity.

There is another type of digital camera that waits for the image data file currently being recorded into a recording medium to be completed after the camera main switch is turned off, and cuts off the power to the camera once the recording of the image data file is completed even if there are still image data files yet to be recorded present in the buffer memory.

This type of digital camera has an advantage in that since the intent of the user wishing to skip further recording of images and start the next photographing operation immediately, which is indicated by turning off the main search, is accommodated, the user can start the subsequent photographing operation right away without having to miss a good photo opportunity. However, if he turns off the main switch by mistake following a photographing operation, all the unrecorded images that are temporarily stored in the buffer memory will be erased.

SUMMARY OF THE INVENTION

Considering the advantages and disadvantages of the different types of digital cameras in the related art described above, it is desirable to allow individual users to choose whether or not images will be recorded when the main switch is turned off, in correspondence to various levels of user knowledge of digital cameras, various levels of operating skills, various purposes of use and various user preferences.

It is desirable to provide a digital camera that allows the user to choose whether or not images are to be recorded when the main switch is turned off.

In a digital camera according to the present invention in which images captured at the image-capturing element are temporally stored in a volatile buffer memory and images stored in the volatile buffer memory are transferred and recorded into a recording medium, there are two power off modes. In a first power off mode, the supply of the stabilized power is stopped in response to a main switch off operation only after recording unrecorded images present in the buffer memory into the recording medium. In a second power off mode, the supply of the stabilized power is stopped in response to a main switch off operation regardless of whether or not there are unrecorded images present in the buffer memory. The supply of the stabilized power is stopped in conformance to the power off mode set at the time of main switch off operation.

In this digital camera, a power off mode selected by a user may be set. The power off mode may be set in correspondence to a digital camera type.

The power off mode may be altered if a specific switch is operated at the time of a main switch off operation. For example, the second power off mode is set if an image delete switch is operated at the time of a main switch off operation when the digital camera has been set in the first power off mode. On the other hand, the first power off mode is set if an image protect switch is operated at the time of a main switch off operation when the digital camera has been set in the second power off mode.

In this digital camera, the first power off mode may be set if a first specific switch is operated at the time of a main switch off operation. In this case, an image protect switch may be utilized as the first specific switch.

In this digital camera, the second power off mode may be set if a second specific switch is operated at the time of a main switch off operation. In this case, an image delete switch may be utilized as the first specific switch.

DETAILED DESCRIPTION OF THE PREFERRED EMBODIMENTS

First Embodiment

Figure 1:
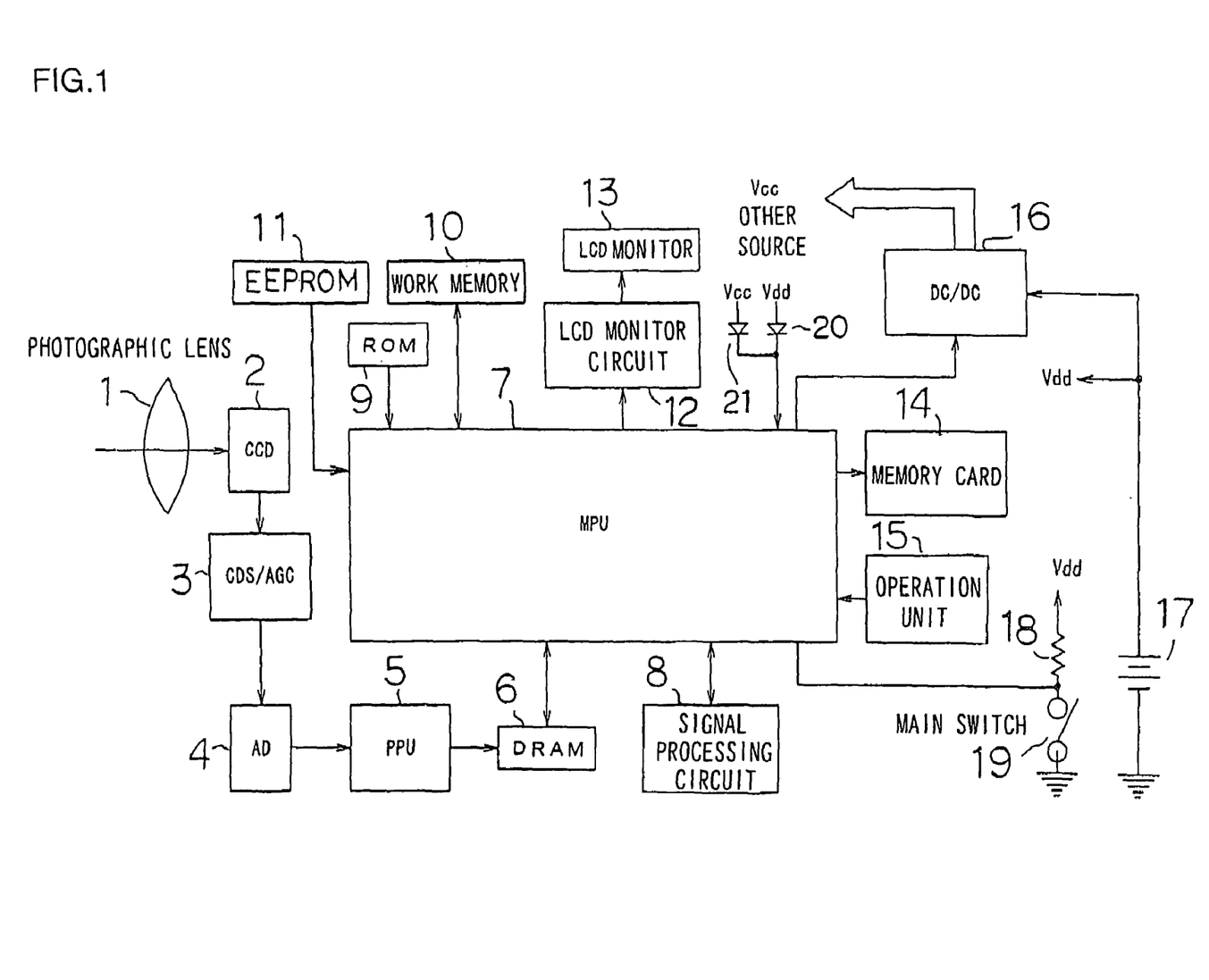
FIG. 1 shows the structure of the digital camera in a first embodiment.

FIG. 1 shows the structure of the digital camera in the first embodiment. A photographic lens 1 forms a subject image on the light receiving surface of a CCD 2. The CCD 2 is an image-capturing element constituted of several million pixels and converts the subject image into electrical signals corresponding to the image.

A CDS/AGC 3 is a unit that includes a correlated double sampling circuit and an automatic gain control circuit. The CDS/AGC 3 generates image signals with a high S/N ratio corresponding to the optical component by reducing the noise component contained in the image signals input from the CCD 2 and also amplifies the image signals thus generated so as to achieve a desirable amplitude for the image signals to be output to an A/D converter 4.

The A/D converter 4 converts the image signals to digital signals and outputs the resulting image data. A PPU 5, which is a pre-process unit provided at a stage preceding in an image data holding buffer memory, executes processing such as white balance adjustment and pixel defect correction. The PPU 5 executes the processing at a speed matching the input image data transfer rate and outputs image data files each corresponding to an image to a DRAM 6.

The DRAM 6 is a volatile memory in which the image data files transferred thereto from the image-capturing element 2 via the CDS/AGC 3, the A/D converter 4 and the PPU 5 and image data files having undergone processing at a signal processing circuit 8 to be detailed later are temporarily stored. In this specification, the DRAM 6 is referred to as a buffer memory.

An MPU 7 is a microprocessor that controls the overall operations of the digital camera. The MPU 7 extracts an image data file stored in the buffer memory 6 and provides the extracted image data file to the signal processing circuit 8, and it also restores the image data file having undergone the signal processing into another area in the buffer memory 6. Then, it transfers the image data having undergone the signal processing to a memory card 14 to be detailed later from the buffer memory 6 and stores the image data file in the memory card 14.

The signal processing circuit 8 executes processing such as outline emphasis and gamma correction on the image data file transferred from the buffer memory 6 and also compresses/decompresses the image data file in the JPEG format.

A ROM 9 is a nonvolatile memory in which various control programs executed by the MPU 7 are stored. A work memory 10, into which the control program to be executed by the MPU 7 is loaded and stored, is normally constituted with a DRAM. The work memory 10 is also used when executing the signal processing on image data files. An EEPROM 11 is a nonvolatile memory in which a photographing mode, photographing conditions and the like set in advance by the user via a menu screen are stored. The photographing modes that may be preset by the user include a power off mode to be detailed later. An LCD monitor circuit 12 is a display control circuit that outputs an image data file having undergone the signal processing to an LCD monitor 13 and displays the output image data file at the LCD monitor 13.

The memory card 14 is a recording medium in which image data files having undergone the signal processing are recorded and is detachably loaded into the camera. An operation unit 15 includes various camera operation members such as a shutter release switch, direction keys, a delete switch to delete photographed images and a protect switch to protect photographed images from erasure. ADC/DC converter 16 raises and stabilizes power Vdd from a battery 17 and supplies the stabilized power Vcc to internal devices and circuits of the camera, such as the image-capturing element 2, the buffer memory 6 and the memory card 14. The DC/DC converter 16 starts and stops the supply of stabilized power Vcc in response to commands issued by the MPU 7.

The basic photographing operation executed in this digital camera is described below. As the shutter release switch at the operation unit 15 is operated, a subject image is captured by the image-capturing element 2. The photographed image in the image-capturing element 2 is temporarily stored into the buffer memory 6 via the CDS/AGC 3, the A/D converter 4 and the PPU 5. It is to be noted that the image data read out from the image-capturing element 2 are stored into the buffer memory 6 in real time with practically no time lag.

Images stored in the buffer memory 6 sequentially undergo processing at the signal processing circuit 8 and the images having undergone the processing are stored back into the buffer memory 6. Images restored in the buffer memory 6 are transferred and recorded into the memory card 14 in the order in which they were stored in the buffer memory 6. Each time an image is photographed, a sequence of operations is executed in which the image is first stored into the buffer memory 6, the image then undergoes image processing and the processed image is then transferred and recorded into the memory card 14.

During a continuous photographing operation, a subsequent frame is photographed and the image data are stored into the buffer memory 6 while the preceding frame undergoes the image processing and is then transferred and recorded into the memory card 14. This parallel processing is executed as long as the buffer memory 6 has an available memory area during the continuous photographing operation. However, once the buffer memory 6 runs out of available memory area, the continuous photographing operation is halted.

As described above, while a photographed image is initially stored into the buffer memory 6 with hardly any time lag, a significant length of time must be allowed to process and record the image into the memory card 14 and thus, there is a time lag before the photographed image is recorded into the memory card 14 in the digital camera. A delay in the image recording becomes more significant when the image data file size is larger or when a greater number of images are photographed through a continuous shooting operation.

Thus, if the power is turned off immediately after the photographing operation, all the image data stored in the volatile buffer memory 6 become lost, including image data that have not yet been recorded into the recording medium such as the memory card 14. In addition, if an image data file is currently being recorded into the recording medium such as the memory card 14 when the power is turned off, image data files that have already been recorded as well as the image data file currently being recorded may become damaged and reading such damaged image data files may become disabled.

The user of the digital camera in the first embodiment is allowed to select a specific power off mode to ensure that the power is turned off without damaging image data files.

The power supply of the digital camera is now explained. A digital camera is normally equipped with two types of power sources. A first source is the source Vdd directly supplied from the battery, which is referred to as the battery source Vdd in the specification. The battery source Vdd is supplied to a main switch 19 which is to be detailed later via a resistor 18 and is also supplied to the MPU 7 when the operation of the DC/DC converter 16 is stopped.

A second source is a high voltage stabilized power Vcc supplied from the DC/DC converter 16. It is referred to as the stabilized power Vcc in the specification. The stabilized power Vcc is supplied to all the internal devices and circuits in the digital camera such as the MPU 7, the image-capturing element 2, the buffer memory 6 and the memory card 14.

As the main switch 19 is turned on, a low level signal is input to the MPU 7, whereas a high level signal is input to the MPU 7 as the main switch 19 is turned off. Based upon the level of the signal input through the main switch 19, the MPU 7 ascertains whether the main switch 19 is in an ON state or in an OFF state. If the main switch 19 is determined to be in an ON state, the MPU 7 immediately engages the DC/DC converter 16 in operation to start supplying the stabilized power Vcc to the various components of the camera.

If the main switch 19 is turned off, the MPU 7 stops the operation of the DC/DC converter 16 as soon as a photographed image is recorded or as soon as an image data file currently being recorded is recorded in conformance to the power off mode to be detailed later, thereby stopping the supply of the stabilized power Vcc to the camera components.

The battery source Vdd is supplied to the MPU 7 via a diode 20 and in addition, the stabilized power Vcc is supplied to the MPU 7 via a diode 21. Since the stabilized power Vcc supplied from the DC/DC converter 16 has a higher voltage than that of the battery source Vdd, the stabilized power Vcc with the higher voltage rather than the battery source Vdd is supplied to the MPU 7 as long as the DC/DC converter 16 is engaged in operation in the main switch ON state. However, as the main switch is turned off and the operation of the DC/DC converter 16 stops, the supply of the high voltage stabilized power Vcc also stops and the battery source Vdd instead of the stabilized power Vcc is now supplied to the MPU 7.

In other words, the battery source Vdd is used as a sleep mode source for the MPU 7. The MPU 7, supplied with the battery source Vdd even when the main switch is off in the sleep mode is able to sense a change in the input signal level from low to high as the main switch 19 is turned on.

As is obvious from the explanation provided above, the main switch 19 is not operated to directly supply/cut off power to the digital camera but is operated to issue commands to start/stop the supply of the stabilized power Vcc from the DC/DC converter 16. In other words, the main switch 19 is operated to set the digital camera in the photographing-enabled state.

Next, the power off mode in the embodiment is explained. Either of two different power off modes can be selected in the embodiment. As the main switch 19 is turned off in a first power off mode, image data files that have not undergone image processing among the image data files stored in the buffer memory 6 are processed at the signal processing circuit 8 and are then recorded into the memory card 14 before the stabilized power Vcc is cut off.

In a second power off mode, the supply of the stabilized power Vcc is immediately stopped as soon as the main switch 19 is turned off regardless of whether or not there are any yet-to-be recorded image data files present in the buffer memory 6. However, if an image data file in the buffer memory 6 is being recorded into the memory card 14 when the main switch 19 is turned off, the supply of the stabilized power Vcc is cut off by stopping the DC/DC converter 16 upon completing the recording of the image data file.

The user of the digital camera in the first embodiment selects either the first power off mode or the second power off mode and presets the camera in the selected power off mode.

Figure 2:
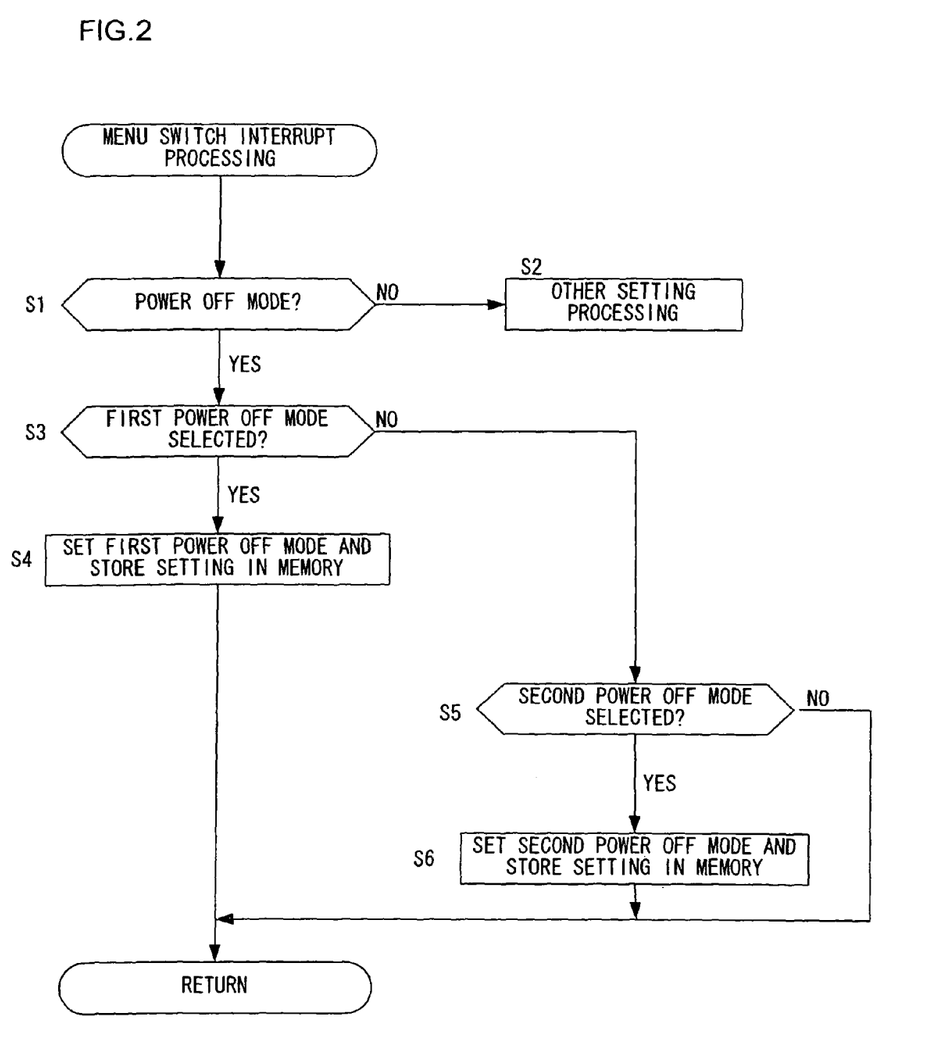
FIG. 2 presents a flowchart of the menu switch interrupt processing executed in the first embodiment.

FIG. 2 presents a flowchart of the menu switch interrupt processing executed in the first embodiment. As the menu switch at the operation unit 15 is turned on, the MPU 7 executes the interrupt processing in FIG. 2. In step S1, a decision is made as to whether or not a power off mode has been selected with a direction key at the operation unit 15 in the menu screen displayed at the LCD monitor 13. If it is decided that a power off mode has not been selected, the operation proceeds to step S2 to execute setting processing corresponding to another photographing mode and photographing conditions having been selected. If, on the other hand, it is decided that a power off mode has been selected, the operation proceeds to step S3.

In step S3, a decision is made as to whether or not the first power off mode has been selected with a direction key at the operation unit 15 in the menu that includes the first power off mode and the second power off mode displayed in the menu screen at the LCD monitor 13. If it is decided that the first power off mode has been selected, the operation proceeds to step S4 to set the first power off mode and record the setting into the EEPROM 11. If, on the other hand, it is decided that the first power off mode has not been selected, the operation proceeds to step S5 to verify that the second power off mode has been selected. If it is decided in step S5 that the second power off mode has been selected, the operation proceeds to step S6 to set the second power off mode and record the setting into the EEPROM 11.

Figure 3:
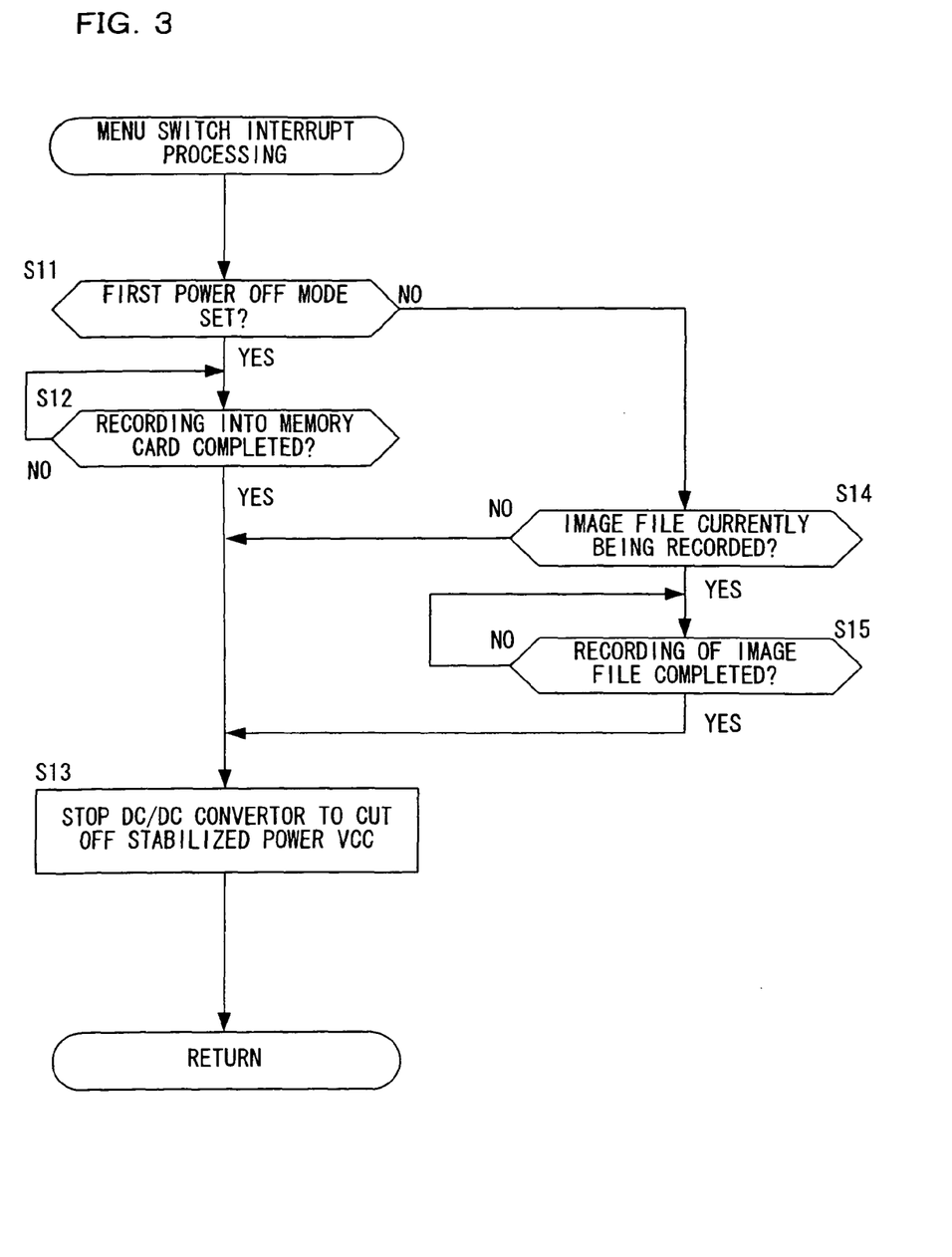
FIG. 3 presents a flowchart of the main switch off interrupt processing executed in the first embodiment.

FIG. 3 presents a flowchart of the main switch interrupt processing executed in the first embodiment. As the main switch 19 is turned off in the camera preset in a specific power off mode, the MPU 7 executes the interrupt processing shown in FIG. 3. In step S11, a decision is made as to whether or not the first power off mode setting has been recorded in the EEPROM 11. If it is decided that the first power off mode setting has been recorded, the operation proceeds to step S12, whereas if it is decided that the first power off mode setting has not been recorded, the operation proceeds to step S14.

In step S12, a decision is made as to whether or not all the image data files in the buffer memory 6 have been recorded into the memory card 14. If it is decided that not all the image data files have been recorded, the image data file recording operation is continuously executed until all the image data files are recorded, and once it is decided that all the image data files have been recorded, the operation proceeds to step S13. In step S13, the supply of the stabilized power Vcc is cut off by stopping the DC/DC converter 16.

Assuming that the second power off mode setting has been recorded in the EEPROM 11, a decision is made in step S14 as to whether or not an image data file in the buffer memory 6 is currently being transferred (recorded) into the memory card 14. If it is decided that no image data file is being transferred (recorded), the operation proceeds to step S13 to cut off the supply of the stabilized power Vcc by stopping the DC/DC converter 16 even if there may be yet-to-be recorded image data files present in the buffer memory 6. If, on the other hand, it is decided that an image data file in the buffer memory 6 is currently being transferred (recorded) into the memory card 14, the operation proceeds to step S15.

In step S15, a decision is made as to whether or not the recording of the transfer-in-progress image data file has been completed. If it is decided that the recording has not been completed, the operation waits for the completion of the recording, and once it is decided that the recording has been completed, the operation proceeds to step S13 to cut off the supply of the stabilized power Vcc by stopping the DC/DC converter 16. In this case, too, the supply of the stabilized power Vcc is stopped even though there may be yet-to-be recorded image data files present in the buffer memory 6.

In the digital camera in the first embodiment, the first power off mode setting or the second power off mode setting selected by the user is recorded in the EEPROM 11, and processing is executed to cut off the supply of the stabilized power Vcc based upon the power off mode setting stored in the EPROM 11 when the main switch is turned off. Thus, the user can indicate whether or not images are to be recorded when the main switch is turned off in correspondence to the photographing conditions and the like simply by selecting either the first power off mode or the second power off mode.

Variation of the First Embodiment

The user may wish to execute processing in a power off mode other than the power off mode preset in the camera depending upon the photographing conditions and the photographing results. For instance, when the first power off mode, in which the stabilized power Vcc is turned off only after all the images are recorded in response to a main switch off operation is preset in the camera, the user, judging that a photographing operation has clearly ended in failure, may wish to take the next photograph immediately. In addition, when the second power off mode in which the stabilized power Vcc is turned off immediately in response to a main switch off operation even if there are yet-to-be recorded images present in the buffer memory 6, is preset in the camera, the user may wish to end the photographing operation after recording the last image having been photographed. A variation of the first embodiment that satisfies such needs is explained below.

Figure 4:
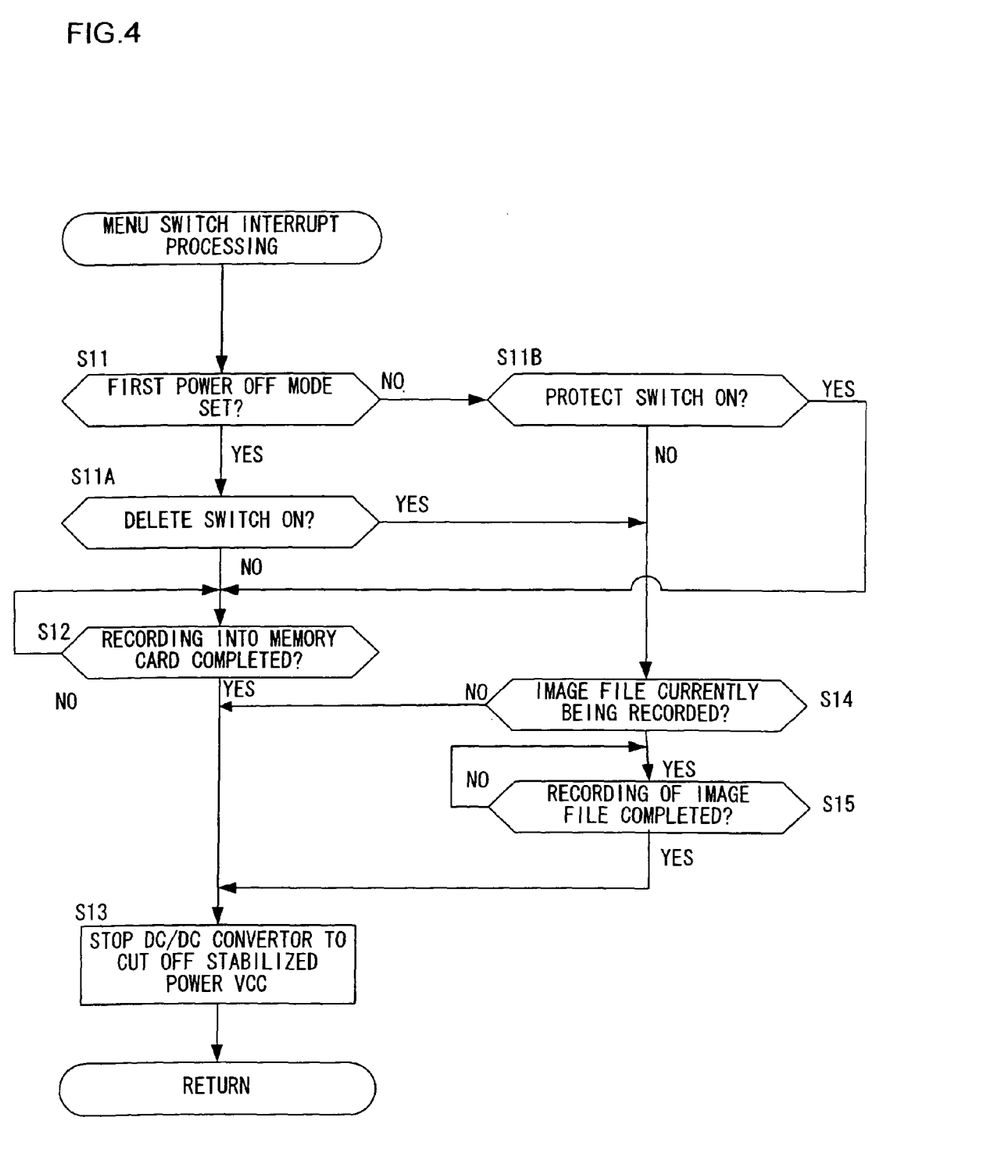
FIG. 4 presents a flowchart of the main switch off interrupt processing executed in a variation of the first embodiment.

FIG. 4 presents a flowchart of the main switch off interrupt processing executed in the variation of the first embodiment. It is to be noted that the same step numbers are assigned to steps in which processing similar to the interrupt processing in FIG. 3 is executed and the explanation focuses on the difference from the processing in FIG. 3. As the main switch 19 is turned off in the camera in a specific power off mode, the MPU 7 executes the interrupt processing in FIG. 4.

In step S11, a decision is made as to whether or not the first power off mode setting has been recorded in the EEPROM 11. The operation proceeds to step S11A if it is decided that the first power off mode setting has been recorded, whereas the operation proceeds to step S11B if it is decided the first power off mode setting has not been recorded.

In step S11A, a decision is made as to whether or not the delete switch at the operation unit 15 was turned on when the main switch was turned off. If it is decided that the main switch 19 was turned off and the delete switch was turned on at the same time, the MPU 7 judges that the user has requested the second power off mode instead of the preset first power off mode, and the operation proceeds to step S14. In step S14 and subsequent steps, the processing is executed in the second power off mode. Namely, the supply of the stabilized power Vcc is cut off even if there are yet-to-be recorded image data file present in the buffer memory 6. However, if an image data file is currently being recorded, the recording of the image data file is first completed and then the supply of the stabilized power Vcc is stopped.

If it is decided in step S11A that the delete switch at the operation unit 15 was not turned on when the main switch 19 was turned off, the operation proceeds to step S12. In step S12 and subsequent steps, the processing is executed in the first power off mode. Namely, the supply of the stabilized power Vcc is cut off after recording all the image data files.

In step S11B, a decision is made as to whether or not the protect switch at the operation unit 15 was turned on when the main switch was turned off. If it is decided that the main switch 19 was turned off and the protect switch was turned on at the same time, the MPU 7 judges that the user has requested the first power off mode instead of the preset second power off mode, and the operation proceeds to step S12. In step S12 and subsequent steps, the processing is executed in the first power off mode.

If it is decided in step S11B that the protect switch at the operation unit 15 was not turned on when the main switch 19 was turned off, the operation proceeds to step S14. In step S14 and subsequent steps, the processing is executed in the second power off mode.

As described above, in the variation of the first embodiment, the processing is executed to stop the supply of the stabilized power Vcc in the second power off mode if the delete switch is turned on at the time of a main switch off operation in the camera preset in the first power off mode. In addition, in the variation of the first embodiment, the processing is executed to stop the supply of the stabilized power Vcc in the first power off mode if the protect switch is turned on at the time of a main switch off operation in the camera preset in the second power off mode. As a result, the user is not only allowed to indicate whether or not images need to be recorded when the main switch is turned off but also is allowed to switch to a power off mode other than the power off mode preset in the camera based upon the photographing conditions or the photographing results.

Second Embodiment

In the digital camera in the first embodiment, the user presets a power off mode in the camera. In the digital camera in the second embodiment, a power off mode is predesignated as the default setting of the camera, and the user is allowed to select a power off mode other than the default setting as necessary.

It is to be noted that the structure of the digital camera in the second embodiment is basically identical to that of the digital camera in the first embodiment shown in FIG. 1 and for this reason, its illustration and explanation are omitted.

Compact digital cameras are designed to fill the needs of typical users. Typical users include a fair number of users with little knowledge of digital cameras and poor operating skills. For this reason, it is safer to preset compact digital cameras operated by such typical users in the first power off mode in which the supply of the stabilized power Vcc is cut off in response to a main switch off operation only after all the images are recorded to the memory card 14. Accordingly, the first power off mode is stored into the ROM 9 as the default setting.

However, some compact digital camera users may wish to select the second power off mode instead of the first power off mode selected as the default setting, depending upon the photographing conditions or the photographing results. The following is an explanation of a power off mode selection method that may be adopted at the time of a main switch off operation.

Figure 5:
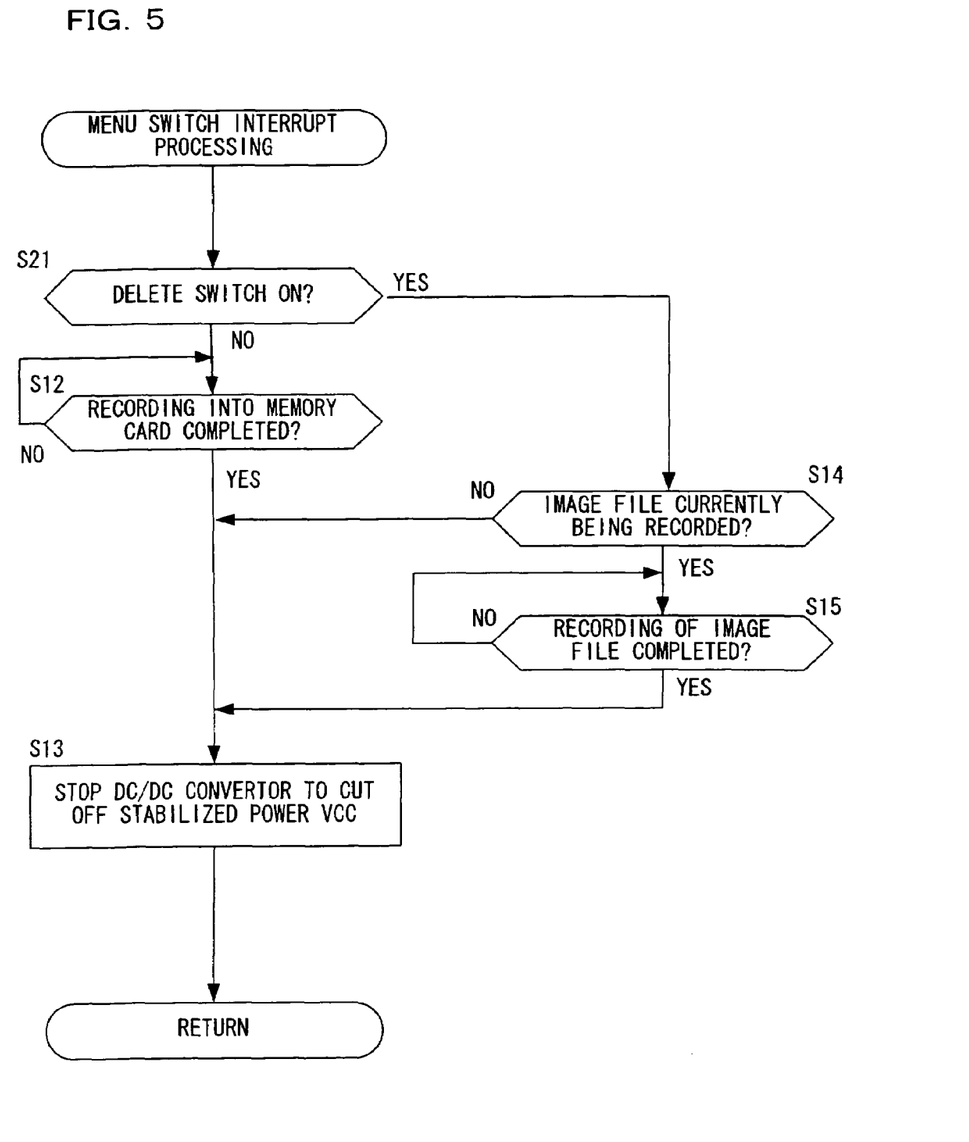
FIG. 5 presents a flowchart of the main switch off interrupt processing executed in a second embodiment.

FIG. 5 presents a flowchart of the main switch off interrupt processing executed in the second embodiment. It is to be noted that the same step numbers are assigned to steps in which processing similar to the interrupt processing in FIG. 3 is executed and the explanation focuses on the difference from the interrupt processing in FIG. 3. As the main switch 19 is turned off in the digital camera with the first power off mode preselected as the default setting, the MPU 7 executes the interrupt processing in FIG. 5.

In step S21, a decision is made as to whether or not the delete switch at the operation unit 15 was turned on when the main switch 19 was turned off. If it is decided that the main switch 19 was turned off and the delete switch was turned on at the same time, the MPU 7 judges that the user has requested the second power off mode instead of the first power off mode preselected as the default setting, and the operation proceeds to step S14. In step S14 and subsequent steps, the processing is executed in the second power off mode. Namely, the supply of the stabilized power Vcc is cut off even if there are yet-to-be recorded image data present in the buffer memory 6. However, if an image data file is currently being recorded, the recording of the image data file is first completed and then the supply of the stabilized power Vcc is stopped.

If it is decided in step S21 that the delete switch at the operation unit 15 was not turned on, the operation proceeds to step S12. In step S12 and subsequent steps, the processing is executed in the first power off mode. Namely, the supply of the stabilized power Vcc is cut off after recording all the image data files.

In the digital camera in the second embodiment, the first power off mode is preselected as the default setting and when the main switch is turned off, processing is normally executed to cut off the supply of the stabilized power Vcc in the first power off mode. However, if the user also turns on the delete switch as he turns off the main switch, the power off mode is switched to the second power off mode to execute the processing to cut off the stabilized power Vcc. Thus, depending upon the photographing conditions or the photographing results, the user is allowed to switch to a power off mode other than the power off mode preselected as the default setting.

Variation of the Second Embodiment

Single lens reflex-type digital cameras are designed so as to fill the needs of skilled users and professional photographers with full knowledge of digital cameras. For this reason, it is desirable to preset such a single lens reflex digital camera in the second power off mode in which the supply of the stabilized power Vcc is immediately cut off in response to a main switch off operation even if there are yet-to-be recorded images present in the buffer memory 6. Accordingly, the second power off mode is stored into the ROM 9 as the default setting.

However, the single lens reflex digital camera user may sometimes wish to select the first power off mode instead of the second power off mode pre-selected as the default setting, depending upon the photographing conditions or the photographing results. The following is an explanation of a power off mode selection method that may be adopted at the time of a main switch off operation.

Figure 6:
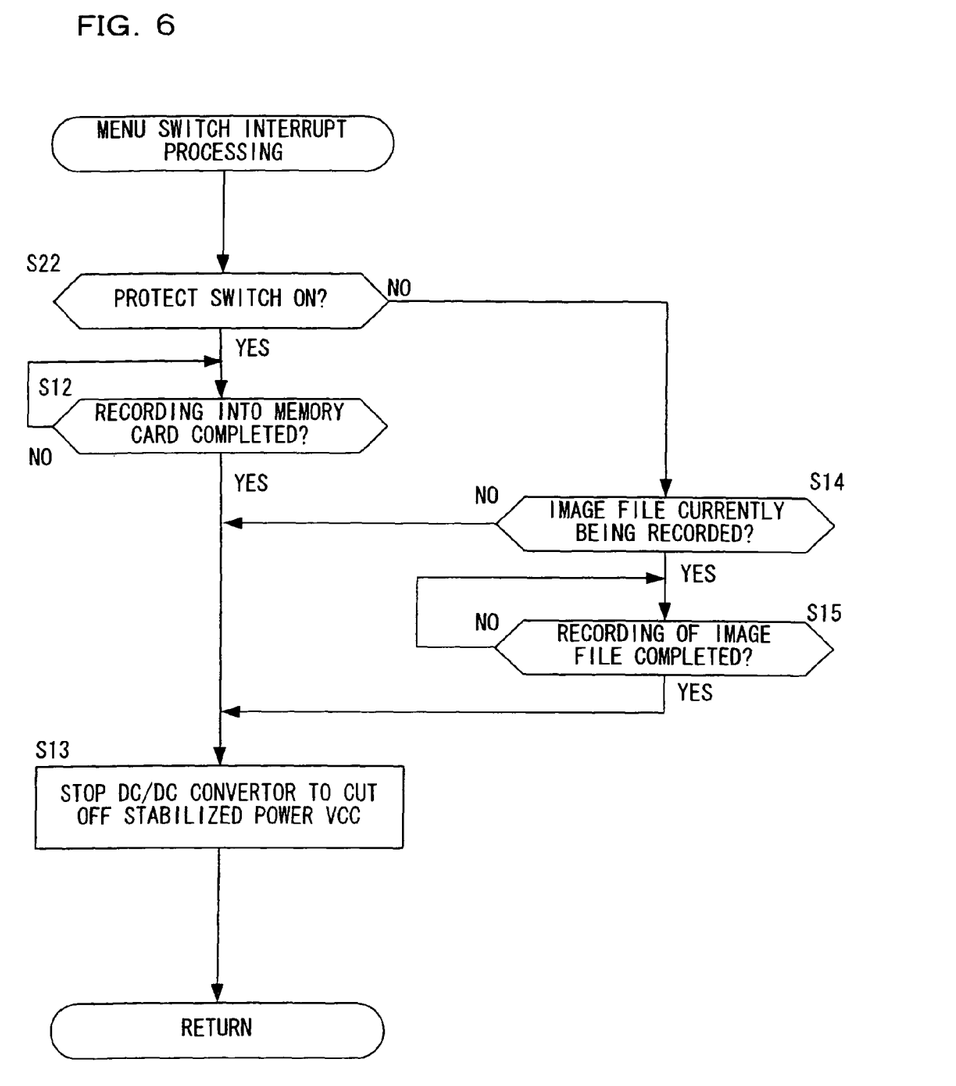
FIG. 6 presents a flowchart of the main switch off interrupt processing executed in a variation of the second embodiment.

FIG. 6 presents a flowchart of the main switch off interrupt processing executed in the variation of the second embodiment. It is to be noted that the same step numbers are assigned to steps in which processing similar to the interrupt processing in FIG. 3 is executed and the explanation focuses on the difference from the interrupt processing in FIG. 3. As the main switch 19 is turned off in the digital camera with the second power off mode preselected as the default setting, the MPU 7 executes the interrupt processing in FIG. 6.

In step S22, a decision is made as to whether or not the protect switch at the operation unit 15 was turned on when the main switch 19 was turned off. If it is decided that the main switch 19 was turned off and the protect switch was turned on at the same time, the MPU 7 judges that the user has requested the first power off mode instead of the second power off mode preselected as the default setting, and the operation proceeds to step S12. In step S12 and subsequent steps, the processing is executed in the first power off mode. Namely, the supply of the stabilized power Vcc is cut off only after all the image data files present in the buffer memory 6 are recorded.

If it is decided in step S22 that the protect switch at the operation unit 15 was not turned on, the operation proceeds to step S14. In step S14 and subsequent steps, the processing is executed in the second power off mode. Namely, the supply of the stabilized power Vcc is immediately cut off even if there are yet-to-be recorded image data present in the buffer memory 6. However, if an image data file is currently being recorded, the supply of the stabilized power Vcc is stopped after the image data file is recorded.

In the variation of the second embodiment, the second power off mode is preselected as the default setting and when the main switch is turned off, processing is normally executed to cut off the supply of the stabilized power Vcc in the second power off mode. However, if the user also turns on the protect switch as he turns off the main switch, the power off mode is switched to the first power off mode to execute the processing to cut off the stabilized power Vcc. Thus, depending upon the photographing conditions or the photographing results, the user is allowed to switch to a power off mode other than the power off mode preselected as the default setting in the camera.

Third Embodiment

In the first embodiment either of the power off modes is preset by the user, whereas in the second embodiment either power off mode is preselected as the default setting. In the digital camera in the third embodiment, a specific power off mode is selected based upon an operation executed when the main switch is turned off instead of pre-setting a power off mode. It is to be noted that the structure of the digital camera in the third embodiment is identical to that of the digital camera in the first embodiment illustrated in FIG. 1, and for this reason, its illustration and explanation are omitted.

Figure 7:
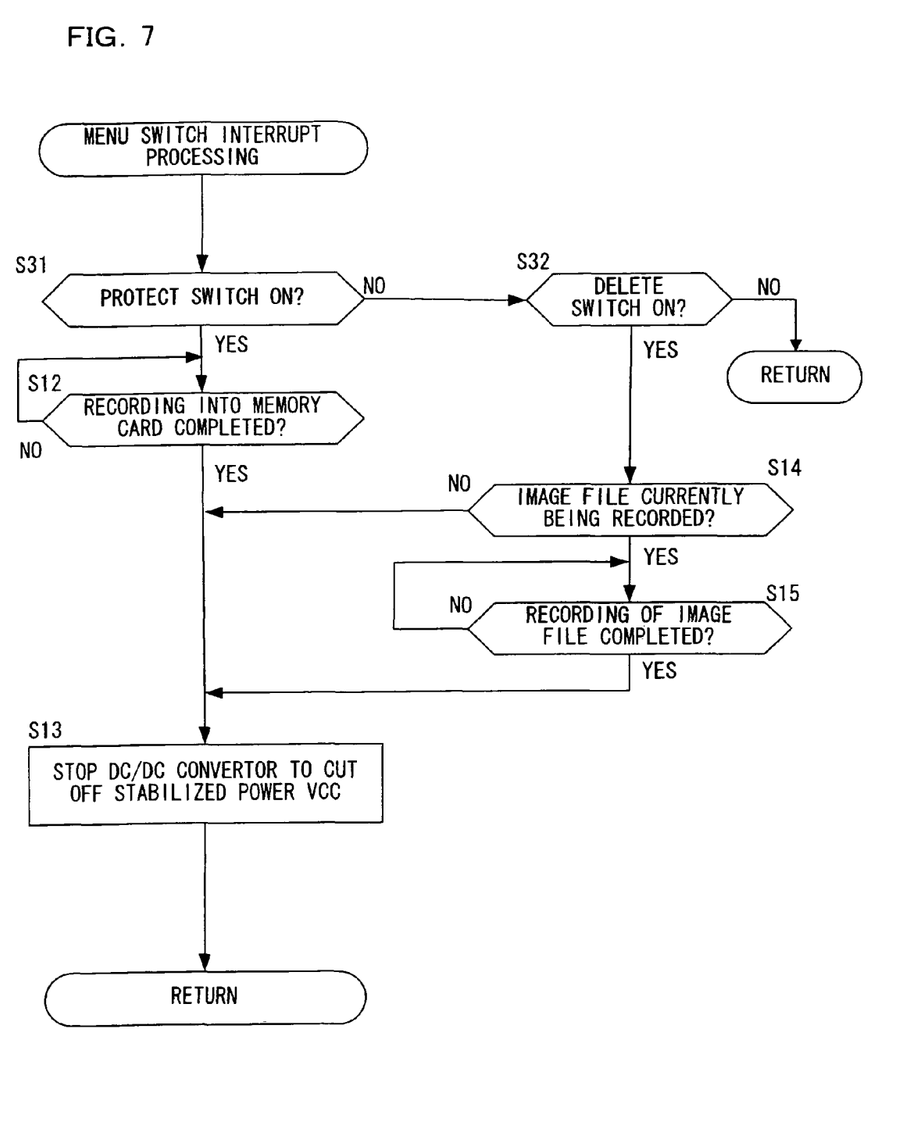
FIG. 7 presents a flowchart of the main switch off interrupt processing executed in a third embodiment.

FIG. 7 presents a flowchart of the main switch off interrupt processing executed in the third embodiment. It is to be noted that the same step numbers are assigned to steps in which processing similar to the interrupt processing in FIG. 3 is executed and the explanation focuses on the difference from the interrupt processing in FIG. 3. As the main switch 19 is turned off, the MPU executes the interrupt processing in FIG. 7.

In step S31, a decision is made as to whether or not the protect switch at the operation unit 15 was turned on when the main switch 19 was turned off. If it is decided that the main switch 19 was turned off and the protect switch (15) was turned on at the same time, the MPU 7 judges that the user has requested the first power off mode, and the operation proceeds to step S12. In step S12 and subsequent steps, the processing is executed in the first power off mode. Namely, the supply of the stabilized power Vcc is cut off only after all the image data files present in the buffer memory 6 are recorded to the memory card 14.

If it is decided in step S31 that the protect switch was not turned on, the operation proceeds to step S32. In step S32, a decision is made as to whether or not the delete switch at the operation unit 15 was turned on when the main switch 19 was turned off. If it is decided that the main switch 19 was turned off and the delete switch was turned on at the same time, the MPU 7 judges that the user has requested the second power off mode, and the operation proceeds to step S14. In step S14 and subsequent steps, the processing is executed in the second power off mode. Namely, the supply of the stabilized power Vcc is cut off even if there are yet-to-be recorded image data files present in the buffer memory 6. However, if an image data file is currently being recorded, the recording of the image data file is first completed and then the supply of the stabilized power Vcc is stopped.

In the digital camera in the third embodiment, the processing is executed in the first power off mode to cut off the supply of the stabilized power Vcc if the protect switch is turned on as the main switch is turned off, whereas the processing is executed in the second power off mode to cut off the supply of the stabilized power Vcc if the delete switch is turned on at the same time as the main switch is turned off. Thus, the user is allowed to determine whether or not images are to be recorded when the main switch is turned off without presetting or default setting a specific power off mode in the digital camera.

The present invention is not limited to the embodiments described above. For instance, while an explanation is given above on an example in which the image delete switch or the image protect switch is operated at the same time as the main switch is turned off, switches other than these may be operated at the time of a main switch off operation.

While an explanation is given above in reference to the embodiments on an example in which a memory card is used as the recording medium in which images are recorded, an image recording medium other than a memory card, such as a CF card, may be used instead as long as it is a nonvolatile recording medium. In addition, while the detachable image recording medium is loaded into the digital camera in the example explained earlier, a permanently fixed image recording medium may be used in the digital camera instead.

While an explanation is given above in reference to the embodiments on an example in which stabilized power is generated by utilizing a DC/DC converter that raises the voltage level of the battery source, any device other than a DC/DC converter may be employed instead as long as stabilized power with a voltage matching the allowable source voltage of the digital camera components and circuits is generated.

What is claimed is:

1. A digital camera comprising:
   an image-capturing element that captures a subject image;
   a volatile buffer memory in which images captured at the image-capturing element are stored;
   a stabilized source circuit that generates stabilized power from a battery source and supplies the stabilized power to the image-capturing element, the volatile buffer memory and a nonvolatile recording medium in which the images stored in the volatile buffer memory are recorded;
   a main switch;
   a control circuit that controls start/stop of a supply of the stabilized power from the stabilized source circuit in response to an ON/OFF operation of the main switch;
   a mode setting device that sets one of a first power off mode, in which the supply of the stabilized power is stopped in response to a main switch off operation only after recording unrecorded images present in the volatile buffer memory into the nonvolatile recording medium and a second power off mode in which the supply of the stabilized power is stopped in response to the main switch off operation regardless of whether or not there are unrecorded images present in the buffer memory, wherein:
   the control circuit (a) controls the stabilized source circuit to stop the supply of the stabilized power, in conformance to the power off mode set by the mode setting device, if the main switch is turned off, and (b) alters a power off mode set by the mode setting device and controls the stabilized source circuit to stop the supply of the stabilized power, in conformance to the altered power off mode, if a switch other than the main switch is operated and the main switch is turned off.

2. A digital camera according to claim 1, wherein:
   the mode setting device sets a power off mode selected by a user.

3. A digital camera according to claim 1, wherein:
   the mode setting device sets a power off mode in correspondence to a digital camera type as a default setting.

4. A digital camera according to claim 1, wherein:
   the control circuit switches to the second power off mode if an image delete switch, corresponding to the switch other than the main switch, is operated at a time of a main switch off operation when the digital camera has been set in the first power off mode by the mode setting device.

5. A digital camera according to claim 1, wherein:
   the control circuit switches to the first power off mode if an image protect switch, corresponding to the switch other than the main switch, is operated at a time of a main switch off operation when the digital camera has been set in the second power off mode by the mode setting device.

6. A digital camera according to claim 1, wherein:
   the mode setting device sets the first power off mode if a first specific switch, corresponding to the switch other than the main switch, is operated at a time of a main switch off operation.

7. A digital camera according to claim 6, wherein:
   the first specific switch is an image protect switch.

8. A digital camera according to claim 1, wherein:
   the mode setting device sets the second power off mode if a second specific switch, corresponding to the switch other than the main switch, is operated at a time of a main switch off operation.

9. A digital camera according to claim 8, wherein:
   the first second specific switch is an image delete switch.

* * * * *